US012390049B2

(12) United States Patent
Jiang et al.

(10) Patent No.: US 12,390,049 B2
(45) Date of Patent: Aug. 19, 2025

(54) GRINDING DEVICE AND COFFEE MACHINE EQUIPPED THEREWITH

(71) Applicant: SUZHOU INDUSTRIAL PARK KALERM ELECTRIC APPLIANCES CO., LTD, Suzhou (CN)

(72) Inventors: Weifeng Jiang, Suzhou (CN); Meisheng Zhu, Suzhou (CN)

(73) Assignee: SUZHOU INDUSTRIAL PARK KALERM ELECTRIC APPLIANCES CO., LTD., Suzhou (CN)

( * ) Notice: Subject to any disclaimer, the term of this patent is extended or adjusted under 35 U.S.C. 154(b) by 320 days.

(21) Appl. No.: 18/331,428

(22) Filed: Jun. 8, 2023

(65) Prior Publication Data

US 2023/0320531 A1     Oct. 12, 2023

Related U.S. Application Data

(63) Continuation of application No. PCT/CN2022/077368, filed on Feb. 23, 2022.

(30) Foreign Application Priority Data

Aug. 18, 2021   (CN) .......................... 202110948041.3

(51) Int. Cl.
     *A47J 42/46*      (2006.01)
     *A47J 31/42*      (2006.01)
     (Continued)

(52) U.S. Cl.
CPC .............. *A47J 42/46* (2013.01); *A47J 31/42* (2013.01); *A47J 42/06* (2013.01); *A47J 42/10* (2013.01);
(Continued)

(58) Field of Classification Search
CPC ............. A47J 42/46; A47J 42/06; A47J 42/26
See application file for complete search history.

(56) References Cited

U.S. PATENT DOCUMENTS

| 7,874,505 | B1 | 1/2011 | Lassota |
| 2014/0224910 | A1* | 8/2014 | Sahli ....................... A47J 42/10 |
| | | | 241/246 |

(Continued)

FOREIGN PATENT DOCUMENTS

| AU | 2019324004 A1 | 1/2021 |
| CN | 101347313 A | 1/2009 |

(Continued)

OTHER PUBLICATIONS

First Office Action issued in counterpart Chinese Patent Application No. 202110948041.3, dated Mar. 18, 2022.

(Continued)

*Primary Examiner* — Mohammed S. Alawadi
(74) *Attorney, Agent, or Firm* — Westbridge IP LLC

(57) ABSTRACT

Disclosed are a grinding device and a coffee machine equipped therewith. The grinding device includes: a grinding housing, provided with a discharge port on a side thereof; first and second grinding elements, coaxially disposed in the grinding housing, and forming a grinding gap, wherein the second grinding element rotates relative to the first grinding element to grind raw material in the grinding gap; a pushing wheel for pushing ground raw material from the grinding gap to the discharging port; a drive assembly, connected to the pushing wheel The pushing wheel includes a torque connection portion, the grinding housing is provided with a through hole for it to pass through, the torque connection portion is radially supported on the grinding housing by a fixed support member, a rolling support member is provided between the pushing wheel and the grinding (Continued)

housing and provides at least axial support for the pushing wheel.

18 Claims, 7 Drawing Sheets

(51) Int. Cl.
    *A47J 42/06*     (2006.01)
    *A47J 42/10*     (2006.01)
    *A47J 42/26*     (2006.01)
    *A47J 42/28*     (2006.01)
    *A47J 42/40*     (2006.01)
    *F16H 57/02*     (2012.01)

(52) U.S. Cl.
    CPC .............. *A47J 42/40* (2013.01); *F16H 57/02* (2013.01); *F16H 2057/02034* (2013.01); *F16H 2057/02073* (2013.01)

(56) References Cited

U.S. PATENT DOCUMENTS

| | | | | |
|---|---|---|---|---|
| 2019/0380535 | A1* | 12/2019 | Ullmann | A47J 42/06 |
| 2020/0060477 | A1 | 2/2020 | Nicholson | |
| 2022/0192425 | A1* | 6/2022 | Nicholson | A47J 42/38 |

FOREIGN PATENT DOCUMENTS

| | | |
|---|---|---|
| CN | 102971078 A | 3/2013 |
| CN | 103767568 A | 5/2014 |
| CN | 103976665 A | 8/2014 |
| CN | 104812278 A | 7/2015 |
| CN | 105167615 A | 12/2015 |
| CN | 204931358 U | 1/2016 |
| CN | 205322053 U | 6/2016 |
| CN | 108784421 A | 11/2018 |
| CN | 109715343 A | 5/2019 |
| CN | 110604485 A | 12/2019 |
| CN | 210169677 U | 3/2020 |
| CN | 111110063 A | 5/2020 |
| CN | 111513587 A | 8/2020 |
| CN | 111712326 A | 9/2020 |
| CN | 112533517 A | 3/2021 |
| CN | 112641349 A | 4/2021 |
| CN | 213309220 U | 6/2021 |
| CN | 213963094 U | 8/2021 |
| CN | 113558498 A | 10/2021 |
| TW | 1539920 B | 7/2016 |
| TW | M602392 U | 10/2020 |
| TW | 202126244 A | 7/2021 |
| WO | 2021037546 A1 | 3/2021 |

OTHER PUBLICATIONS

International Search Report issued in corresponding PCT Application No. PCT/CN2022/077368, dated May 25, 2022.
Extended European Search Report issued in counterpart European Patent Application No. 22857221.0, dated Nov. 18, 2024.
First Office Action issued in counterpart Chinese Patent Application No. 202210958999.5, dated Mar. 29, 2025.

* cited by examiner

GRINDING DEVICE AND COFFEE MACHINE EQUIPPED THEREWITH

CROSS-REFERENCE TO RELATED APPLICATIONS

The present application is a continuation of International Application No. PCT/CN2022/077368, filed on Feb. 23, 2022, which claims priority to Chinese Patent Application No. CN202110948041.3, filed on Aug. 18, 2021. The disclosures of the aforementioned applications are hereby incorporated by reference in their entireties.

TECHNICAL FIELD

The present disclosure relates to a grinding device, in particular, to a grinding device for grinding coffee beans and a coffee machine equipped with the grinding device.

BACKGROUND

Coffee is a fashionable beverage widely favored by consumers. When making coffee, it is usually necessary to grind coffee beans into coffee powder. However, the coffee powder is prone to losing its aroma due to oxidation. To fully retain the aroma of coffee power, automatic coffee machines grinding coffee beans automatically are increasingly popular with average consumers. These coffee machines typically have a grinding device for grinding coffee beans. However, for mass-produced grinding devices, the graininess of ground coffee powder varies among different devices, resulting in inconsistent graininess of coffee powder ground by different grinding devices. In addition, coffee powder ground by a traditional grinding device often has uneven graininess.

SUMMARY

The purpose of the present disclosure is to provide a grinding device with high assembly accuracy and more reliable use.

To achieve the above purpose, the present disclosure provides a grinding device, including:
  a grinding housing, provided with a discharge port on a side thereof;
  a first grinding element and a second grinding element, coaxially disposed in the grinding housing, wherein a grinding gap is formed between the first grinding element and the second grinding element, and the second grinding element rotates relative to the first grinding element to grind raw material to be ground in the grinding gap;
  a pushing wheel, disposed below the second grinding element and connected to the second grinding element to drive the second grinding element to rotate, wherein rotation of the pushing wheel is capable of pushing ground raw material from the grinding gap to the discharging port; and
  a drive assembly, disposed below the grinding housing, and connected to the pushing wheel in a torque-transmitting manner, wherein
  the pushing wheel and the drive assembly include a torque connection portion, the grinding housing is provided with a through hole for the torque connection portion to pass through, the torque connection portion is radially supported to the grinding housing by a fixed support member, a rolling support member is provided between the pushing wheel and the grinding housing, and the rolling support member provides at least axial support for the pushing wheel.

As a further improvement of an implementation of the present disclosure, the fixed support member is configured as a metal shaft sleeve, a bottom of the pushing wheel is provided with an input end extending along an axial direction, the drive assembly includes a torque output member, the torque output member is fixedly connected to the input end in a circumferential direction, and the input end is configured as the torque connection portion.

As a further improvement of an implementation of the present disclosure, the rolling support member is supported between the pushing wheel and the fixed support member.

As a further improvement of an implementation of the present disclosure, the rolling support member includes a plurality of balls, the bottom of the pushing wheel is provided with a first rolling groove, the fixed support member is provided with a second rolling groove, and the plurality of balls move along the first rolling groove and the second rolling groove.

As a further improvement of an implementation of the present disclosure, a seal member is further provided between the pushing wheel and the grinding housing, the seal member is adjacent to a radially outer side of the fixed support member and protrudes upward, so that the seal member is in contact with the pushing wheel.

As a further improvement of an implementation of the present disclosure, the bottom of the pushing wheel is further provided with an annular groove, the annular groove is disposed at an interval with the rolling support member, and the seal member extends into the annular groove.

As a further improvement of an implementation of the present disclosure, the bottom of the grinding housing is provided with a first stepped portion and a second stepped portion which are sunk in turn, the seal member is mounted on the first stepped portion, and the fixed support member is mounted on the second stepped portion.

As a further improvement of an implementation of the present disclosure, the grinding housing is provided with a bottom surface adjacent to the discharge port, the grinding housing includes a stepped portion sunk relative to the bottom surface, and the fixed support member is mounted on the stepped portion and is flush with the bottom surface.

As a further improvement of an implementation of the present disclosure, the rolling support member and the fixed support member are respectively provided on both sides of the through hole at an interval along the axial direction.

As a further improvement of an implementation of the present disclosure, the rolling support member is supported between the pushing wheel and the grinding housing, and a direction along which force is applied to the rolling support member is disposed obliquely with respect to the axial direction.

As a further improvement of an implementation of the present disclosure, a first support portion and a second support portion are respectively provided on both ends, along the axial direction, of the through hole, the rolling support member is supported between the first support portion and the pushing wheel, and the fixed support member is mounted on the second support portion.

As a further improvement of an implementation of the present disclosure, the bottom of the pushing wheel is provided with an input end extending along the axial direction, and a first arc surface is formed between a bottom plane of the pushing wheel and an outer circumferential surface of the input end, a second arc surface is formed on the first support portion, and the rolling support member is located between the first arc surface and the second arc surface.

As a further improvement of an implementation of the present disclosure, the drive assembly includes a torque output member fixed, along the axial direction, to the pushing wheel and the second grinding element, a limit member is provided between the torque output member and the grinding housing, and the limit member fills an axial gap between the torque output member and the grinding housing to limit an axial upward displacement of the second grinding element.

As a further improvement of an implementation of the present disclosure, the limit member is configured as a planar bearing, a rolling member, or a wave washer.

As a further improvement of an implementation of the present disclosure, the bottom of the grinding housing is provided with a stepped portion that is sunk, the fixed support member is mounted on an inner side of the stepped portion, and the limit member is abutted between the torque output member and an outer side of the stepped portion.

As a further improvement of an implementation of the present disclosure, a support portion is provided on a side, facing the torque output member along the axial direction, of the through hole, the fixed support member is mounted on the support portion, and the limit member is abutted between the torque output member and the fixed support member.

As a further improvement of an implementation of the present disclosure, the grinding housing includes an extension wall extending downward along its periphery, the drive assembly includes a motor, a transmission mechanism driven by the motor, and a gear box for accommodating the transmission mechanism, the motor is connected to one end of the gear box, and the other end of the gear box is connected to the extension wall, the bottom of the grinding housing is provided with a stepped portion that is sunk, a cavity is formed between the extension wall and an outer side of the stepped portion, and a plurality of reinforcing rib plates are provided in the cavity at intervals in a circumferential direction.

The present disclosure further provides a coffee machine, which includes the grinding device above-mentioned.

According to the grinding device provided by the present disclosure, the radial support and the axial support of the pushing wheel that drives the second grinding element are supported to the grinding housing, so that the parts in the grinding housing can be independent of the drive assembly, thereby reducing the number of parts in the dimension chain. Meanwhile, an independent radial fixed support member is added, thereby effectively reducing cumulative errors of dimension. The pushing wheel is directly cooperated with the grinding housing through the fixed support member, so that the coaxial accuracy of the second grinding element and the grinding housing can be ensured. Meanwhile, the axial rolling support can reduce the support span, and the direction along which force is applied is downward which is consistent with the direction along which force is applied to the second grinding element, so that the problem of creeping of parts caused by stress can be improved.

DETAILED DESCRIPTION OF THE EMBODIMENTS

For ease of understanding, the following is an example explanation of a traditional grinding device.

Figure 1:
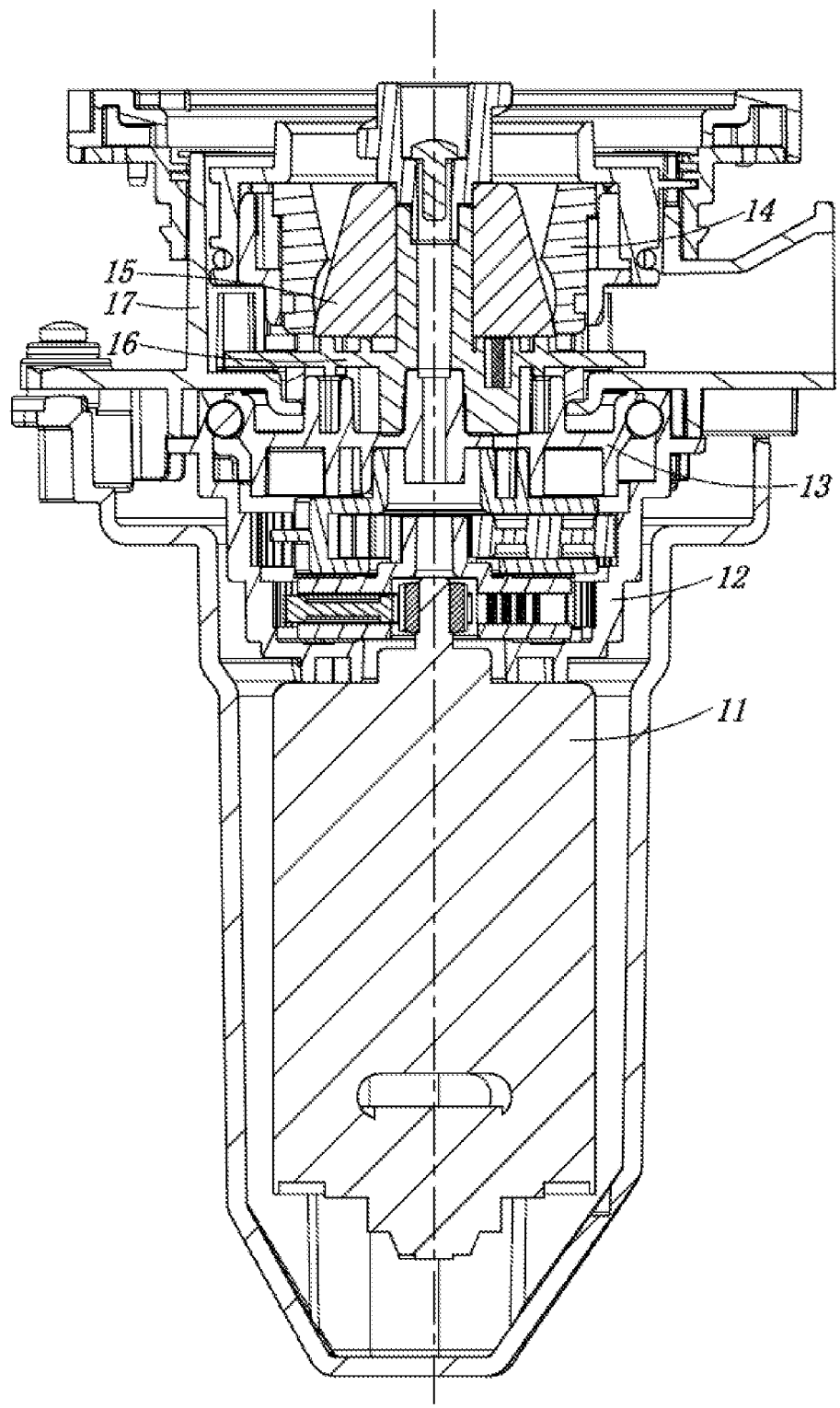
FIG. 1 is a structural schematic diagram of a traditional grinding device.
Figure 2:
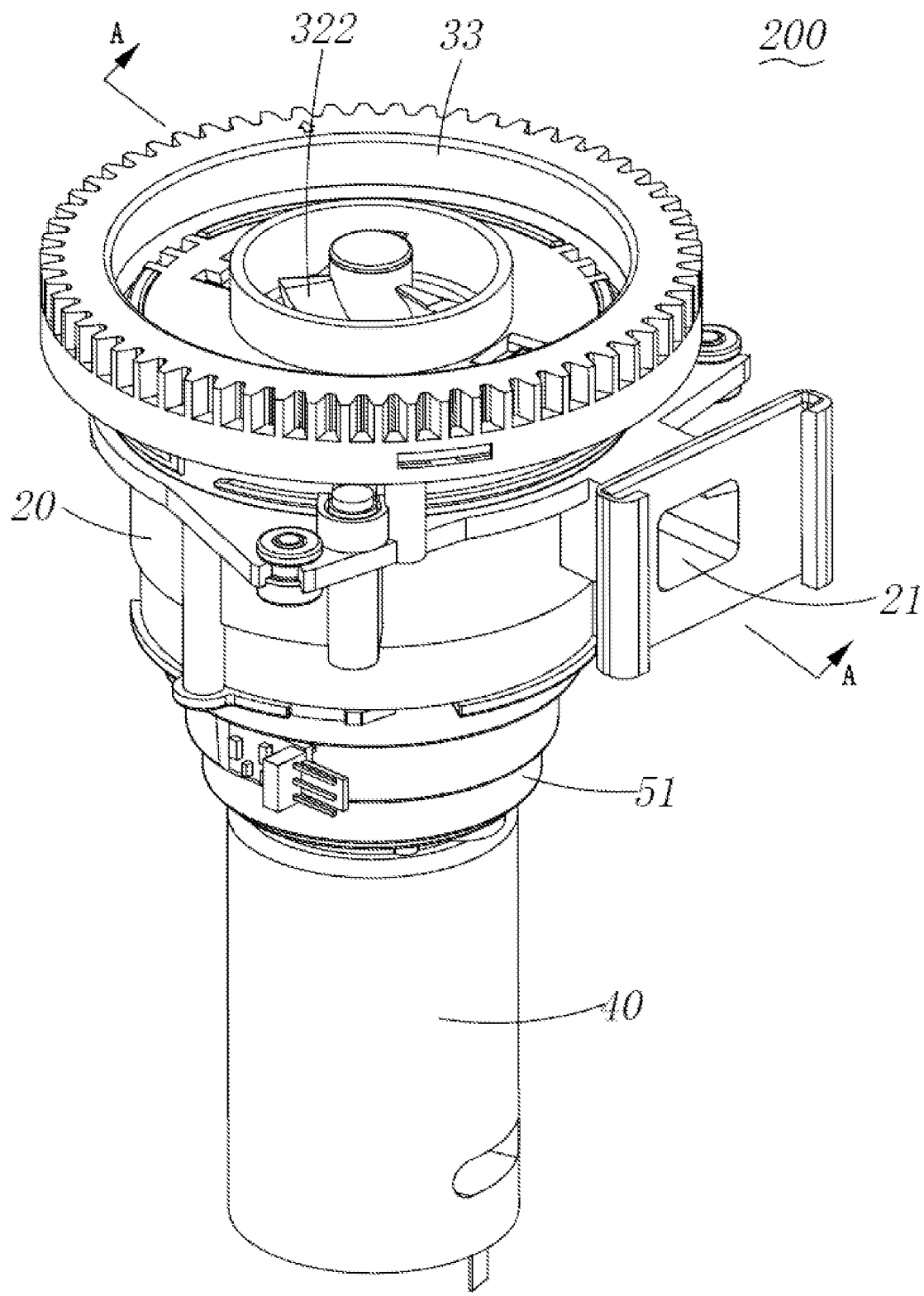
FIG. 2 is a structural schematic diagram of a grinding device in a first implementation of the present disclosure.
Figure 3:
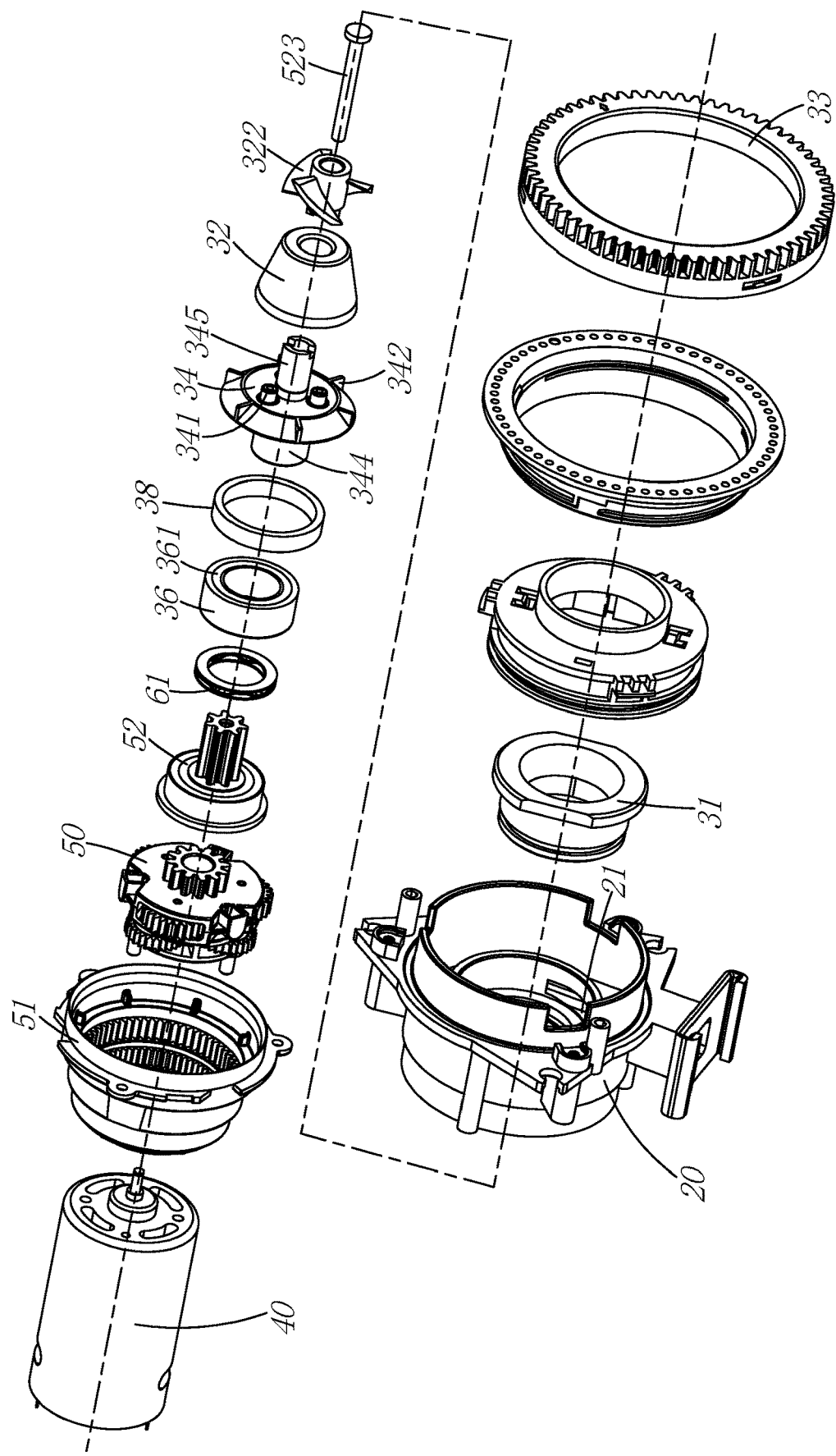
FIG. 3 is a schematic perspective exploded diagram of the grinding device in FIG. 2.
Figure 4:
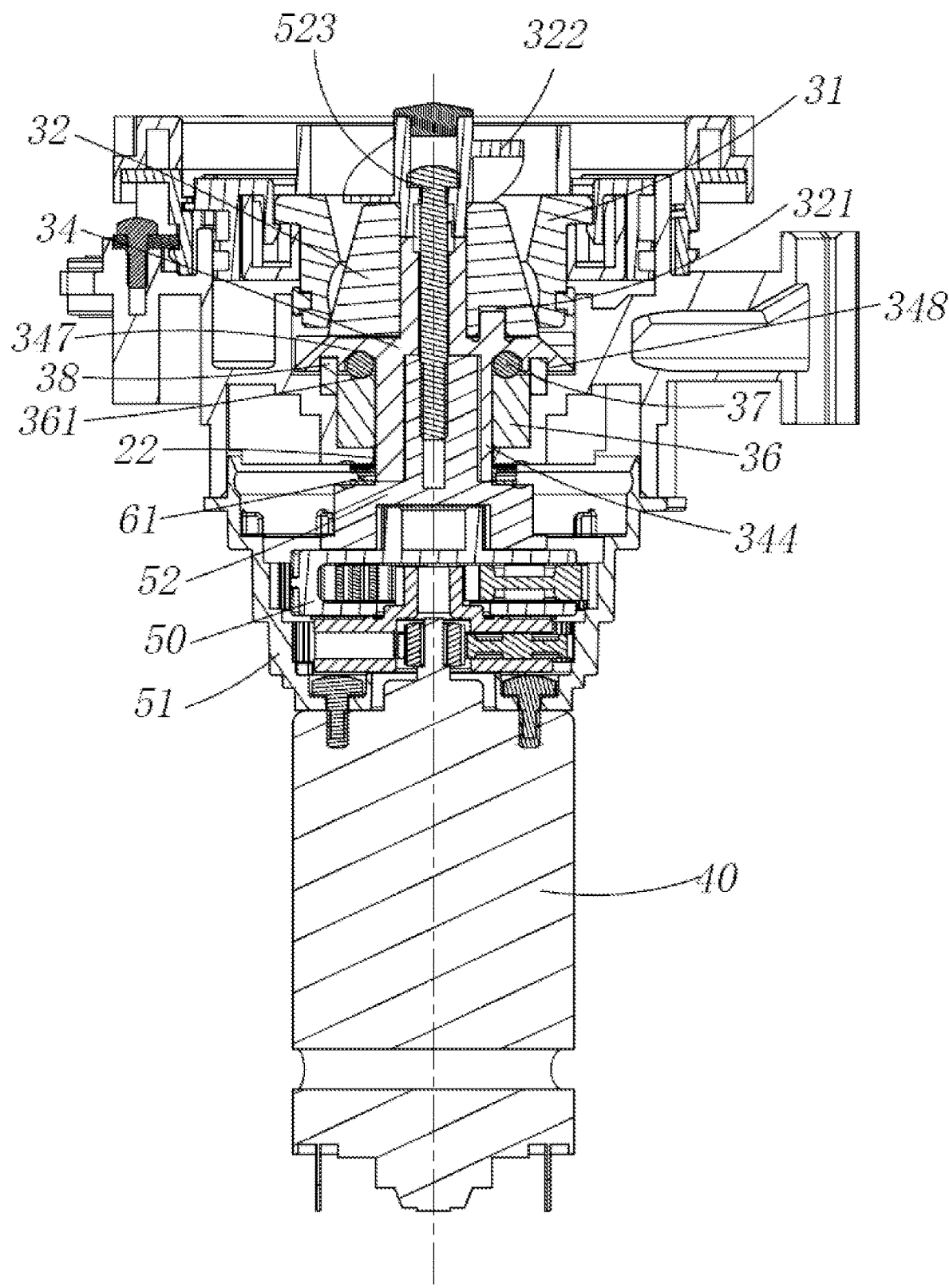
FIG. 4 is a schematic cross-sectional diagram of the grinding device taken along the A-A line in FIG. 2.
Figure 5:
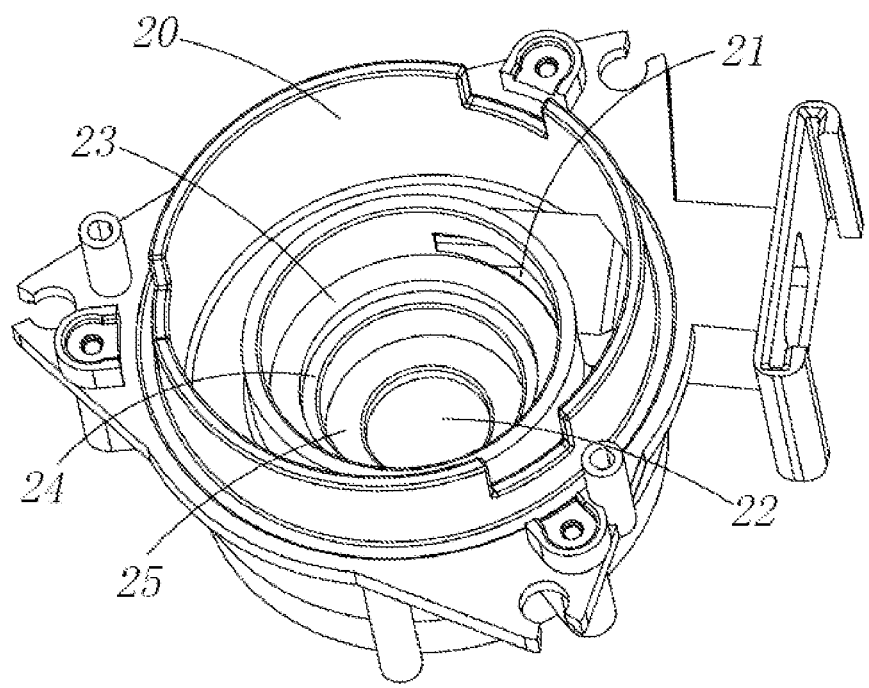
FIG. 5 is a schematic perspective diagram of a grinding housing of the grinding device in FIG. 2.
Figure 6:
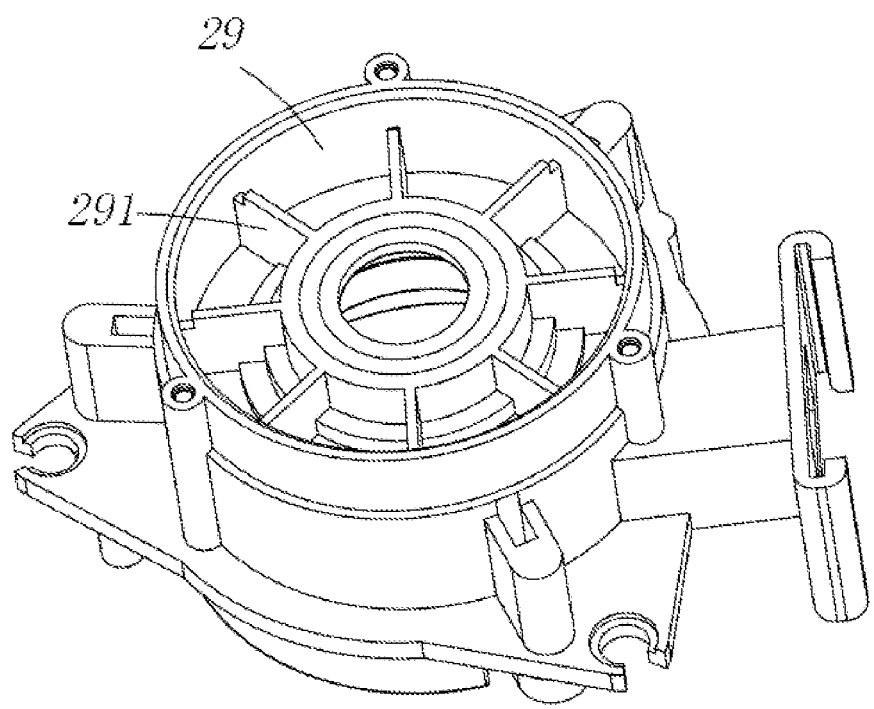
FIG. 6 is a schematic perspective diagram of the grinding housing in FIG. 5 taken from another view angle.
Figure 7:
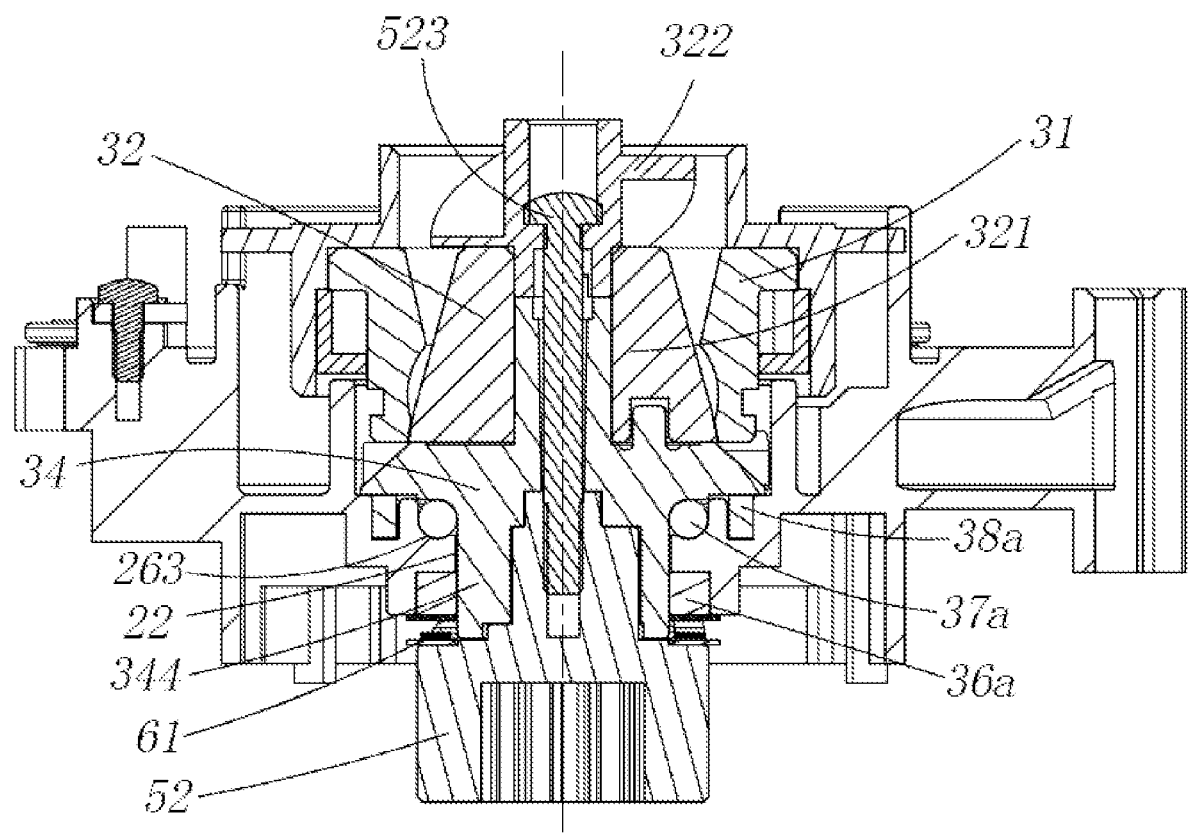
FIG. 7 is a schematic cross-sectional diagram of a grinding device in a second implementation of the present disclosure.
Figure 8:
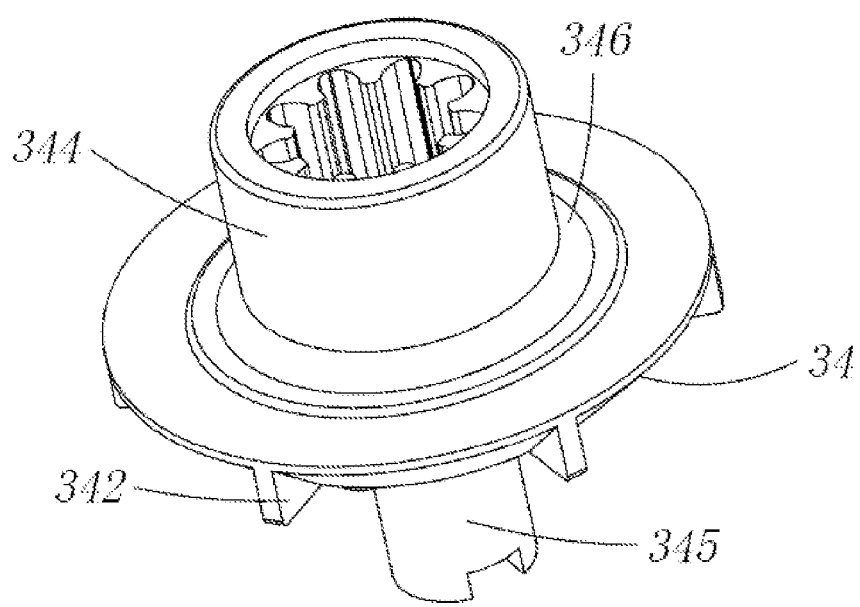
FIG. 8 is a schematic perspective diagram of a pushing wheel of the grinding device in FIG. 7.
Figure 9:
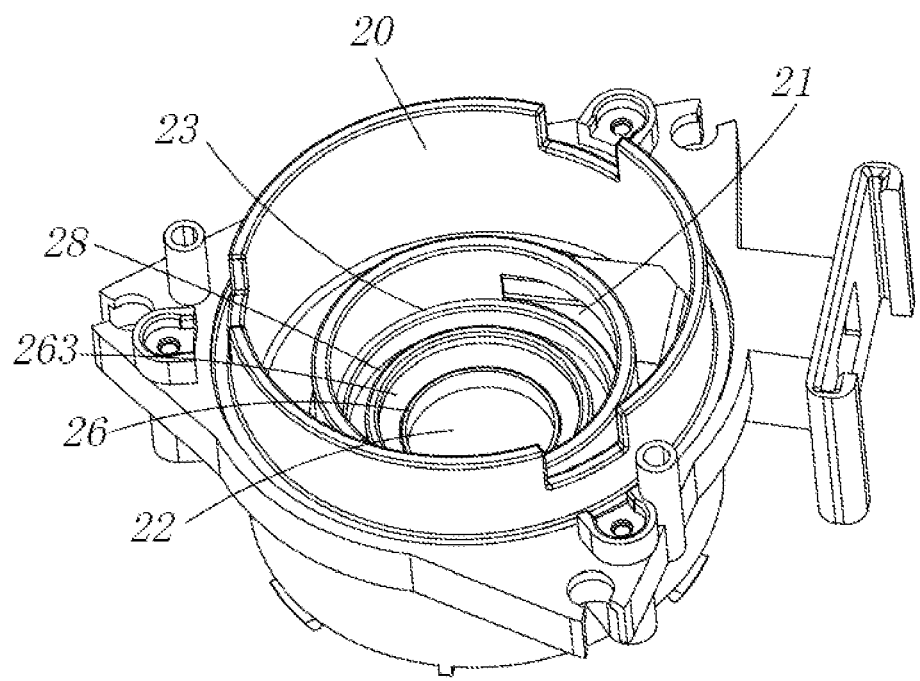
FIG. 9 is a schematic perspective diagram of a grinding housing of the grinding device in FIG. 7.
Figure 10:
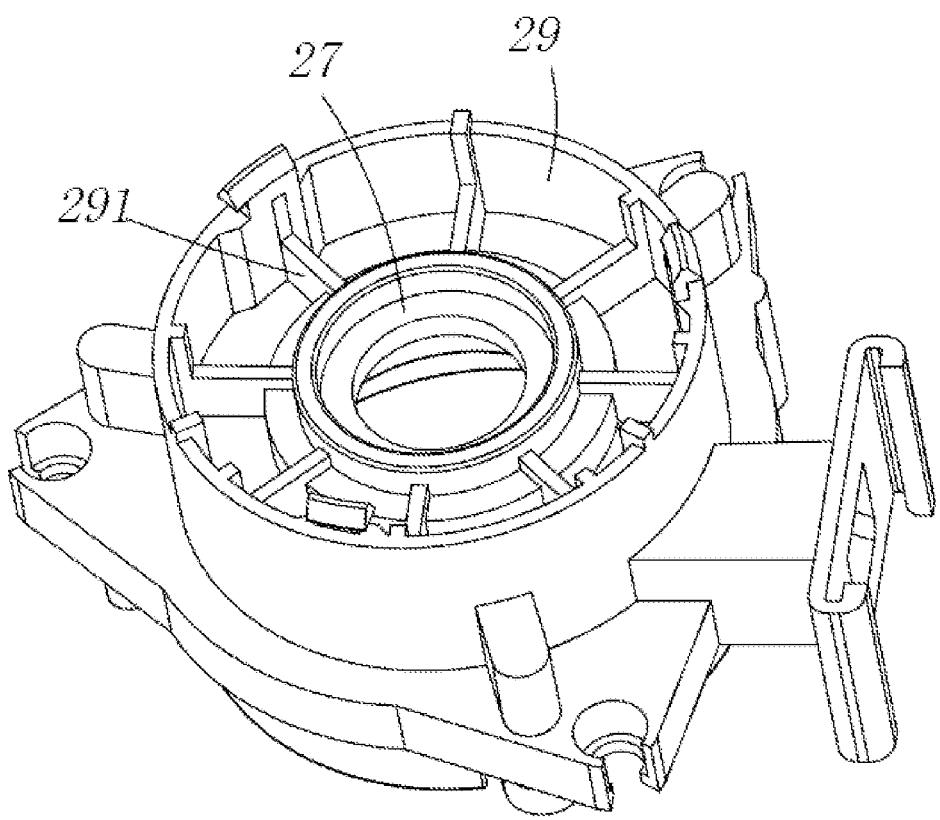
FIG. 10 is a schematic perspective diagram of the grinding housing in FIG. 9 taken from another view angle.

As shown in FIG. 1, a traditional bean-grinding device for grinding coffee beans generally includes a motor 11, a gear-box portion 12, and a bean-grinding assembly. The motor 11 outputs power to the bean-grinding assembly through the gear-box portion 12. The bean-grinding assembly includes an upper grinding tool 14 and a lower grinding tool 15 disposed in a coffee powder box 17. The lower grinding tool 15 receives the power and rotates relative to the upper grinding tool 14 to grind coffee beans between the upper grinding tool 14 and the lower grinding tool 15. The gear-box portion 12 includes a planetary gear and a steel-ball fixing seat 13. The steel-ball fixing seat 13 forms a tight fit with the housing of the gear-box portion 12 through a plurality of steel balls rotating on the outer circumferential side of the steel-ball fixing seat 13, so that the coaxiality of the steel ball fixing seat 13 and the gear box portion 12 can be ensured. A propeller 16 is disposed below the lower grinding tool 15, and the propeller 16 is fixed to the steel ball fixing seat 13, the purpose of which is also to make the lower grinding tool 15 fixed to the propeller 16 rotate more stably. The coffee powder box 17 cooperates with the gear-box portion 12, and the upper grinding tool 14 cooperates with the coffee powder box 17. By a series of cooperations, the coaxiality of the upper grinding tool 14 and the lower grinding tool 15 can be ensured, and the consistency of the graininess can be ensured.

To ensure the coaxiality of the upper and lower grinding tools 14,15, it is necessary to ensure the accuracy of all mating parts. Due to the large number of mating parts in the traditional grinding device, the cumulative errors are large which leads to the inability to ensure the coaxiality between the upper and lower grinding tools 14,15. Consequently, the consistency of graininess of mass-produced traditional grinding devices is poor.

Moreover, since the diameter of the steel-ball fixing seat 13 is large, when the steel-ball fixing seat 13 is subjected to an axial force (i.e., when grinding beans), the central portion of the steel ball fixing seat 13 will creep, which will cause the lower grinding tool 15 to rise and sink. The sinking and rising of the lower grinding tool 15 makes the distance between the upper and lower grinding tools 14,15 change, so that the graininess of the ground powder is uneven.

In view of this, the present disclosure provides a grinding device applied to a coffee machine. The present disclosure is described in detail below with reference to the specific implementations shown in the figures. These implementations do not aim to limit the present disclosure. Changes in structure, method, or function made by those of ordinary skill in the art based on these implementations shall fall into the protection scope of the present disclosure.

It should be understood that the terms used herein, such as "upper", "above", "lower", "below" and other terms indicating the relative position of space, are for the purpose of describing the relationship of one unit or feature to another as shown in the figures. The terms of spatial relative positions may be intended to include different positions of the device in use or operation other than those shown in the figures.

The grinding device in the implementations of the present disclosure may be used in a coffee machine. Below, the grinding device will be described with an automatic coffee machine capable of grinding coffee beans as an example. It should be understood that the grinding device in the embodiments of the present disclosure can also be used alone or applied to other devices.

Referring to FIGS. 2 to 6, in a first implementation, the grinding device 200 includes a grinding housing 20, a discharging port 21 is provided on a side of the grinding housing 20. A first grinding element 31 and a second grinding element 32 are coaxially disposed in the grinding housing 20. A grinding gap is formed between the first grinding element 31 and the second grinding element 32. The second grinding element 32 rotates relative to the first grinding element 31 to grind raw material to be ground in the grinding gap. The grinding elements 31,32 herein may be flat-tool grinders or tapered-tool grinders, which completes the grinding of coffee beans by driving the second grinding element 32 to rotate. In addition, the first grinding element 31 is fixedly connected to the grinding housing 20 in a circumferential direction, and the position, along the axial direction, of the first grinding element 31 may be adjusted through an adjusting ring 33, so that the size of the ground coffee powder granule can be selected. When the first grinding element 31 is adjusted to ascend, the grinding gap becomes larger to make the ground coffee powder particles bigger; and when the first grinding element 31 is adjusted to descend, the grinding gap becomes smaller to make the ground coffee powder particles smaller.

A pushing wheel 34 is disposed below the second grinding element 32, and the pushing wheel 34 is connected to the second grinding element 32 to drive the second grinding element 32 to rotate. In this embodiment, an upper surface of the pushing wheel 34 is provided with three positioning columns 341; correspondingly, the lower side of the second grinding element 32 is provided with three positioning holes 321. The positioning columns 341 are respectively inserted into the corresponding positioning holes 321 to circumferentially fix the pushing wheel 34 to the second grinding element 32, so that the pushing wheel 34 is capable of driving the second grinding element 32 to rotate. Rotation of the pushing wheel 34 is also capable of pushing ground raw material from the grinding gap to the discharging port 21. Specifically, the pushing wheel 34 is provided with a discharging plate 342 arranged in a circumferential direction, and the discharging plate 342 is located on the upper side of the pushing wheel 34 and at the edge of the pushing wheel 34. For example, the pushing wheel 34 may be provided with a plurality of discharging plates 342, and the plurality of discharging plates may be disposed at uniform intervals along the circumferential direction of the pushing wheel 34. The ground raw material in the grinding gap will fall to the edge of the pushing wheel 34, and the pushing wheel 34 will drive the discharging plates 342 to rotate to push the ground raw material to move to the discharging port 21.

Further, a drive assembly is disposed below the grinding housing 20, and the drive assembly is connected to the pushing wheel 34 in a torque-transmitting manner to drive the pushing wheel 34 to rotate. The drive assembly includes a motor 40, a transmission mechanism 50 driven by the motor 40, and a gear box 51 for accommodating the transmission mechanism 50, the motor 40 is connected to one end of the gear box 51. The transmission mechanism 50 may be a planetary gear reduction mechanism, or other transmission mechanisms, as long as the torque output from the motor 40 can be transmitted to the pushing wheel 34. In this embodiment, the rotation axis of the motor 40 is disposed to be coaxial with the rotation axis of the second grinding element 32. In other embodiments, the rotation axis of the motor 40 may be disposed to be parallel or perpendicular to the second grinding element 32. Herein the pushing wheel 34 and the drive assembly include a torque connection portion, the grinding housing 20 is provided with a through hole 22 for the torque connection portion to pass through, the torque connection portion is radially supported to the grinding housing 20 by a fixed support member 36, a rolling support member 37 is provided between the pushing wheel 34 and the grinding housing 20, and the rolling support member 37 provides at least axial support for the pushing wheel 34.

By setting the radial support for the torque connection portion of the pushing wheel 34 and the drive assembly, as well as the axial support for the pushing wheel 34, both associated with the grinding housing 20, the number of mating parts in the dimension chain is reduced, thereby effectively reducing cumulative errors. The pushing wheel 34 is radially supported to the grinding housing 20 by a fixed support member 36, so as to ensure the coaxiality between the grinding housing 20 and the second grinding element 32, and therefore, the consistency of the graininess of the mass-produced grinding devices can be ensured. In addition, the axial support reduces the span of the rolling support member 37. The radial fixed support member 36 is provided. Due to the low rotational speed of the second grinding element 32 itself, the friction between the second grinding element 32 and the fixed support member 36 may be ignored, so that the coaxial accuracy can be improved and the costs can be reduced while ensuring the stable rotation of the second grinding element 32. The support direction of the rolling support member 37 is consistent with the direction along which force is applied to the second grinding element 32, so that the span of the rolling support member 37 can be reduced and the problem of creeping of parts caused by stress can be also improved.

Referring to FIGS. 3 and 4 again, the fixed support member 36 may be configured as a metal shaft sleeve, a bottom of the pushing wheel 34 is provided with an input end 344 extending along an axial direction, the drive assembly includes a torque output member 52, the torque output member 52 is connected to the output end of the transmission mechanism 50, and the torque output member 52 is fixedly connected to the input end 344 in a circumferential direction. Specifically, the torque output member 52 may be inserted into the input end 344 for connection, that is, the input end 344 is configured as the torque connection portion, and the fixed support member 36 is in direct contact with the input end 344, so that the support for the pushing wheel 34 can be more stable. The dimensional accuracy of the metal shaft sleeve is high, and the errors caused by it can be ignored, so that the coaxial accuracy of the second grinding element 32 and the grinding housing 20 can be ensured.

In this embodiment, the rolling support member 37 is supported between the pushing wheel 34 and the fixed support member 36. When the pushing wheel 34 drives the second grinding element 32 to rotate, the rolling support member 37 can reduce the friction between the pushing wheel 34 and the fixed support member 36, and more kinetic energy of the pushing wheel 34 can be used to grind coffee beans. Meanwhile, by the direct contact between the fixed support member 36 and the rolling support member 37, during the manufacturing of the grinding housing 20, it is only needed to control the sizes of the portion, of the grinding house 20, mating with the fixed support member 36 to ensure the coaxiality between the pushing wheel 34 and the grinding housing 20, so that the manufacturing cost of the grinding device can be reduced.

Specifically, the rolling support member 37 includes a plurality of balls, the bottom of the pushing wheel 34 is provided with a first rolling groove 347, and the fixed support member 36 is provided with a second rolling groove 361. The plurality of balls move along the first rolling groove 347 and the second rolling groove 361. The rotation of the pushing wheel 34 is supported by the plurality of balls, so that the overall torque transmission can be more stable. In addition, to directly form the rolling grooves 347,361 on the pushing wheel 34 and the fixed support member 36 can reduce the size of the axial fit between the pushing wheel 34 and the grinding housing 20, so that the overall structure of the grinding device can be more compact. Moreover, using the lower surface of the pushing wheel 34 as a part of the rolling bearing can effectively reduce components while meeting the functional requirements.

In addition, to make the fixed support member 36 support the pushing wheel 34 more stable, the axial length of the fixed support member 36 may be between one half and three quarters of the axial length of the output end 344. In this way, in order to reduce the overall axial size of the grinding device, the depth of the first rolling groove 347 may be set to be greater than the radius of the rolling member, so that the axial dimension of the grinding housing can be reduced while ensuring the span of the radial support of the fixed support member 36.

During the process of grinding coffee beans, to prevent coffee powder from entering the torque connection portion (that is, the area where moving parts is located) from the gap between the pushing wheel 34 and the grinding housing 20, a seal member 38 may be provided between the pushing wheel 34 and the grinding housing 20. For example, the seal member 38 may be constructed as a felt ring. The felt ring has a good sealing effect and can effectively prevent the entry of coffee powder. Specifically, the seal member 38 may be adjacent to a radially outer side of the fixed support member 36 and protrudes upward, so that the seal member 38 is in contact with the pushing wheel 34. In this way, the seal member 38 can prevent coffee powder from entering the transmission area, and can prevent lubricating oil or friction debris from the transmission area from entering the coffee powder delivery area in the grinding housing. For example, the fixed support member 36 can also assist in positioning the seal member 38 to ensure the reliable use of the grinding device. Specifically, the bottom of the pushing wheel 34 may be further provided with an annular groove 348, the annular groove 348 is disposed at an interval with the first rolling groove 347. The seal member 38 extends into the annular groove 348, so that a rising movement for coffee powder is required to enter the transmission area, which can better block the entry of coffee powder.

To facilitate mounting of the fixed support member 36, the grinding housing 20 has a bottom surface 23 which is adjacent to the discharging port 21. The grinding housing 20 includes a stepped portion sunk relative to the bottom surface 23, and the fixed support member 36 is mounted on the stepped portion and is flush with the bottom surface 23, thereby facilitating to control the gap between the pushing wheel 34 and the grinding housing 20. The seal member 38 may be radially spaced from the fixed support member 36 or may be radially in contact with the fixed support member 36. Specifically, the stepped portion includes a first stepped portion 24 and a second stepped portion 25 which are sunk in turn towards the bottom side of the grinding housing 20. The seal member 38 is mounted on the first stepped portion 24, the fixed support member 36 is mounted on the second stepped portion 25. In this way, after the fixed support member 36 is mounted, the position of the seal member 38 is simultaneously limited, thereby facilitating the manufacturing of the grinding housing and the assembly of the grinding device.

In the above embodiments, the pushing wheel 34 is rotationally supported within the grinding housing 20, which cooperates with the drive assembly outside the grinding housing 20. The drive assembly includes a torque output member 52 fixed, along the axial direction, to the pushing wheel 34 and the second grinding element 32. For example, the second grinding element 32, the pushing wheel 34, and the torque output member 52 can be connected together from top to bottom through a screw 523, so as to fix the three together axially. In addition, a screw feeding member 322 may be provided above the second grinding element 32 to guide coffee beans into the grinding gap between the first grinding element 31 and the second grinding element 32. A convex column 345 extends upward from the pushing wheel 34, the convex column 345 is inserted into the second grinding element 32, and the convex column 345 is connected to the screw feeding member 322 in a torque-transmitting manner. For example, the screw 523 may pass through the screw feeding member 322, so as to cause the screw feeding member 322 to abut against the upper surface of the second grinding element 32. In this way, the screw 523 can axially fix the screw feeding member 322, the second grinding element 32, the pushing wheel 34, and the torque output member 52 together. For example, the pushing wheel 34 and the torque output member 52 may by connected through splines, which can be the insertion of the torque output member 52 into the pushing wheel 34, or the insertion of the pushing wheel 34 into the torque output member 52. In the above embodiments, the torque output member 52 is specifically inserted into the pushing wheel 34, and radial and axial support can be directly act on the pushing wheel 34 to make the rotation of the pushing wheel 34 more stable.

To prevent the second grinding element 32 from colliding with the first grinding element 31 caused by the upward movement of the second grinding element 32 during grinding, especially during idling, a limit member 61 is provided between the torque output member 52 and the grinding housing 20, and the limit member 61 fills an axial gap between the torque output member 52 and the grinding housing 20 to limit an axial upward displacement of the second grinding element 32. By locking the relative position between the torque output part 52 and the grinding housing 20, it is ensured that the axial position of the second grinding element 32 is fixed. For example, the limit member 61 may be configured as a planar bearing or a wave washer, or of course may be a plurality of rolling members disposed between the torque output member 52 and the grinding housing 20. The torque output member 52 and the pushing wheel 34 are fixed together by the screw 523, the second grinding element 32 has no axial movement space, and the planar bearing or rolling member can play a role in reducing friction during the rotation of the torque output member 52. And the wave washer can maintain a downward trend of the pushing wheel 34 through the torque output member 52 to prevent the second grinding element 32 from colliding with the first grinding element 31 caused by the upward movement of the second grinding element 32 during grinding, especially during idling.

Specifically, the second stepped portion 25 has an inner side on which the fixed support member 36 is mounted and an outer side facing the drive assembly, and the limit member 61 abuts against the torque output member 52 and the outer side of the second stepped portion 25 and located between the two. The second grinding element 32 is fixed to the torque output member 52 by the screw 523. By limiting the gap between the torque output member 52 and the grinding housing 20, the limit member 61 can define the axial position of the second grinding element 32 relative to the grinding housing 20, so that the overall assembly of the grinding device is very convenient and the structure is more reliable.

Further, to facilitate the overall assembly of the grinding device, the grinding housing 20 includes an extension wall 29 extending downward along its periphery, the motor 40 is connected to one end of the gear box 51, and the other end of the gear box 51 is connected to the extension wall 29, the torque output member 52 is connected to the output end of the transmission mechanism in a torque-transmitting manner, such as through splines. During assembly, the drive assembly can be connected to the grinding housing 20 as a whole; the components within the grinding housing 20 are connected based on the grinding housing 20, resulting in small cumulative errors and high assembly accuracy. A cavity is formed between the outer side of the stepped portion at the bottom of the grinding housing 20 and the extension wall 29, in which a plurality of reinforcing rib plates 291 are provided an interval in a circumferential direction to further enhance the overall strength of the grinding housing 20.

Referring to FIGS. 7 to 10, it is a second implementation of a grinding device of the present disclosure. In this implementation, components with the same label as the first implementation have the similar structure and function as the first implementation, and for the purpose of simplicity, details are not described herein again. The difference is that the rolling support member 37a and the fixed support member 36a are respectively disposed on both sides of the through hole 22 at an interval along an axial direction, that is, both the rolling support member 37a and the fixed support member 36a are supported between the pushing wheel 34 and the grinding housing 20. By separating the axial support from the radial support, the two support points are cooperated, the axial support of the rolling support member 37a bears downward pressure during grinding, thus reducing the friction between the pushing wheel 34 and the grinding housing 20. For the radial fixed support member 36a, the pushing wheel 34 and the grinding housing 20 are both cooperated with it, thereby greatly improving the coaxial accuracy. In this embodiment, it is specific that the direction along which force is applied to the rolling support member 37a is disposed obliquely with respect to the axial direction, that is, the force bearing angle of the rolling support member 37a is at a preset angle with the rotation axis of the pushing wheel 34 to ensure the coaxiality of the pushing wheel 34 and the grinding housing 20, and to bear the downward pressure during grinding, which can further improve the coaxiality accuracy. By forming a two-point radial support, the axial length of the fixed support member 36a can be reduced while ensuring the support span, so that the axial length of the fixed support member 36a can be less than one half of the axial length of the input end 344 of the pushing wheel 34. Specifically, the axial length of the fixed support member 36a is between one fourth and one half of the axial length of the input end 344, so that the overall height of the grinding housing can be reduced.

Specifically, a first support portion 26 and a second support portion 27 are respectively provided on both ends, along the axial direction, of the through hole 22, the rolling support member 37a is supported between the first support portion 26 and the pushing wheel 34, and the fixed support member 36a is mounted on the second support portion 27. The first support portion 26 and the second support portion 27 may be configured as two stepped portions respectively disposed on both sides of the through hole 22, so as to facilitate the manufacturing of the grinding housing 20. The bottom of the pushing wheel 34 is provided with an input end 344 extending along the axial direction, and a first arc surface 346 is formed between a bottom plane of the pushing wheel 34 and an outer circumferential surface of the input end 344, a second arc surface 263 is formed on the first support portion 26, and the rolling support member 37a is located between the first arc surface 346 and the second arc surface 263, that is, the first arc surface 346 and the second arc surface 263 cooperate to define a motion track for the rolling support member 37a. The force angle of the rolling support member 37a may be adjusted by setting the position of the arc surface, a specific angle of this embodiment is 45 degrees, which is convenient for manufacturing and more stable for the rotational support of the pushing wheel 34. In addition, to extend the service life of the pushing wheel 34, a raised stepped surface may be disposed radially from the outside to the inside at the bottom of the pushing wheel 34, so that the first arc surface 346 can be disposed on a higher stepped surface, and the normal operation will not be affected even if wear occurs during a long-term use.

In this embodiment, to prevent coffee powder from entering the torque connection portion (i.e., the area where moving parts is located) from the gap between the pushing wheel 34 and the grinding housing 20, a seal member 38a may also be provided between the pushing wheel 34 and the grinding housing 20. An annular mounting groove 28 is disposed on the grinding housing 20 at an interval with the first support portion 26. The seal member 38a may be inserted into the mounting groove 28 and the upper portion of the seal member 38a abuts against the bottom surface of the pushing wheel 34, thereby preventing coffee powder from entering the transmission area through the seal member 38a. To prevent the sealing failure caused by the rising of the pushing wheel 34 due to a large accumulation of coffee powder, an elastic element may be mounted at the bottom of the seal member 38a. In this way, the seal member 38a maintains a trend of abutting against the pushing wheel 34 upward under the action of the elastic element. Even if the pushing wheel 34 rises, the seal member 38a can still maintain a close contact with the pushing wheel 34, thereby enhancing the sealing effect.

In this embodiment, to prevent the second grinding element 32 from colliding with the first grinding element 31 caused by the upward movement of the second grinding element 32, a limit member 61 may abut against the torque output member 52 and the fixed support member 36a and be located between the two. In this way, the limit member 61 can also achieve axial restraint of the fixed support member 36a, thus improving the reliability of the overall structure. As in the first embodiment, the drive assembly is integrally connected to the grinding housing 20. During the grinding process, the motor 40 outputs power to the torque output member 52 through the transmission mechanism 50 to make it start rotating. The torque output member 52 is fixed together with the pushing wheel 34 and the second grinding element 32, so the second grinding element 32 can be start rotating together. During this process, the fixed support member 36a cooperates with the pushing wheel 34, thereby ensuring the stability of the rotation of the second grinding element 32. Meanwhile, the rolling support member 37a and the limit member 61 rotate irregularly during this process, thus reducing the friction between the pushing wheel 34 and the grinding housing 20, as well as the friction between the torque output member 52 and the grinding housing 20.

In the above embodiment, the radial support and the axial support of the pushing wheel 34 that drives the second grinding element 32 are supported on the grinding housing 20, so that the components in the grinding housing 20 can be independent of the drive assembly, thereby reducing the number of parts in the dimension chain. Meanwhile, an independent radial fixed support member is added, thereby reducing errors of dimension. The pushing wheel 34 is directly cooperated with the grinding housing 20 through the fixed support member 36a, so that the coaxial accuracy of the second grinding element 32 and the grinding housing 20 can be ensured. At the same time, the axial rolling support 37a can reduce the support span, and the direction along which force is applied to the rolling support 37a is downward, its direction along which force is applied to is consistent with the direction along which force is applied to the second grinding element 32, so that the problem of creeping of parts caused by stress can be improved.

Other embodiments of the present disclosure provide a coffee machine. The coffee machine includes the grinding device above-mentioned.

It should be understood that although this specification is described under the implementations, not every implementation only contains an independent technical solution. This description is only for the sake of clarity. Those of ordinary skill in the art should take the specification as a whole, and the technical solutions in each implementation can also be appropriately combined to form other implementations that can be understood by those of ordinary skill in the art.

The series of detailed descriptions listed above are only specific descriptions of feasible implementations of the present disclosure, and are not intended to limit the protection scope of the present disclosure. Any equivalent implementations or changes that do not depart from the spirit of the art of the present disclosure shall fall into the protection scope of the present disclosure.

What is claimed is:

1. A grinding device, comprising:
a grinding housing, provided with a discharging port on a side thereof;
a first grinding element and a second grinding element, coaxially disposed in the grinding housing, wherein a grinding gap is formed between the first grinding element and the second grinding element, and the second grinding element rotates relative to the first grinding element to grind raw material to be ground in the grinding gap;
a pushing wheel, disposed below the second grinding element and connected to the second grinding element to drive the second grinding element to rotate, wherein rotation of the pushing wheel is capable of pushing ground raw material from the grinding gap to the discharging port; and
a drive assembly, disposed below the grinding housing, and connected to the pushing wheel in a torque-transmitting manner, wherein:
the pushing wheel comprises a torque connection portion, the grinding housing is provided with a through hole for the torque connection portion to pass through, the torque connection portion is radially supported to the grinding housing by a fixed support member, a rolling support member is provided between the pushing wheel and the grinding housing, and the rolling support member provides at least axial support for the pushing wheel.

2. The grinding device according to claim 1, wherein the fixed support member is configured as a metal shaft sleeve, a bottom of the pushing wheel is provided with an input end extending along an axial direction, the drive assembly comprises a torque output member, the torque output member is fixedly connected to the input end in a circumferential direction, and the input end is configured as the torque connection portion.

3. The grinding device according to claim 1, wherein the rolling support member is supported between the pushing wheel and the fixed support member.

4. The grinding device according to claim 3, wherein the rolling support member comprises a plurality of balls, a bottom of the pushing wheel is provided with a first rolling groove, the fixed support member is provided with a second rolling groove, and the plurality of balls move along the first rolling groove and the second rolling groove.

5. The grinding device according to claim 3, wherein a seal member is provided between the pushing wheel and the grinding housing, the seal member is adjacent to a radially outer side of the fixed support member and protrudes upward, so that the seal member is in contact with the pushing wheel.

6. The grinding device according to claim 5, wherein a bottom of the pushing wheel is further provided with an annular groove, the annular groove is disposed at an interval with the rolling support member, and the seal member extends into the annular groove.

7. The grinding device according to claim 5, wherein a bottom of the grinding housing is provided with a first stepped portion and a second stepped portion which are sunk in turn, the seal member is mounted on the first stepped portion, and the fixed support member is mounted on the second stepped portion.

8. The grinding device according to claim 3, wherein the grinding housing is provided with a bottom surface adjacent to the discharging port, the grinding housing comprises a stepped portion sunk relative to the bottom surface, and the fixed support member is mounted on the stepped portion and is flush with the bottom surface.

9. The grinding device according to claim 1, wherein the rolling support member and the fixed support member are respectively provided on both sides of the through hole at an interval along an axial direction.

10. The grinding device according to claim 9, wherein the rolling support member is supported between the pushing wheel and the grinding housing, and a direction along which force is applied to the rolling support member is disposed obliquely with respect to the axial direction.

11. The grinding device according to claim 10, wherein a first support portion and a second support portion are respectively provided on both ends, along the axial direction, of the through hole, the rolling support member is supported between the first support portion and the pushing wheel, and the fixed support member is mounted on the second support portion.

12. The grinding device according to claim 11, wherein a bottom of the pushing wheel is provided with an input end extending along the axial direction, and a first arc surface is formed between a bottom plane of the pushing wheel and an outer circumferential surface of the input end, a second arc surface is formed on the first support portion, and the rolling support member is located between the first arc surface and the second arc surface.

13. The grinding device according to claim 1, wherein the drive assembly comprises a torque output member fixed, along an axial direction, to the pushing wheel and the second grinding element, a limit member is provided between the torque output member and the grinding housing, and the limit member fills an axial gap between the torque output member and the grinding housing to limit an axial upward displacement of the second grinding element.

14. The grinding device according to claim 13, wherein the limit member is configured as a planar bearing, a rolling member, or a wave washer.

15. The grinding device according to claim 13, wherein a bottom of the grinding housing is provided with a stepped portion that is sunk, the fixed support member is mounted on an inner side of the stepped portion, and the limit member is abutted between the torque output member and an outer side of the stepped portion.

16. The grinding device according to claim 13, wherein a support portion is provided on a side, facing the torque output member along the axial direction, of the through hole, the fixed support member is mounted on the support portion, and the limit member is abutted between the torque output member and the fixed support member.

17. The grinding device according to claim 1, wherein the grinding housing comprises an extension wall extending downward along a periphery of the grinding housing; the drive assembly comprises a motor, a transmission mechanism driven by the motor, and a gear box for accommodating the transmission mechanism; the motor is connected to one end of the gear box, and the other end of the gear box is connected to the extension wall, a bottom of the grinding housing is provided with a stepped portion that is sunk, a cavity is formed between the extension wall and an outer side of the stepped portion, and a plurality of reinforcing rib plates are provided in the cavity at intervals in a circumferential direction.

18. A coffee machine, comprising the grinding device according to claim 1.

* * * * *